UNITED STATES PATENT OFFICE.

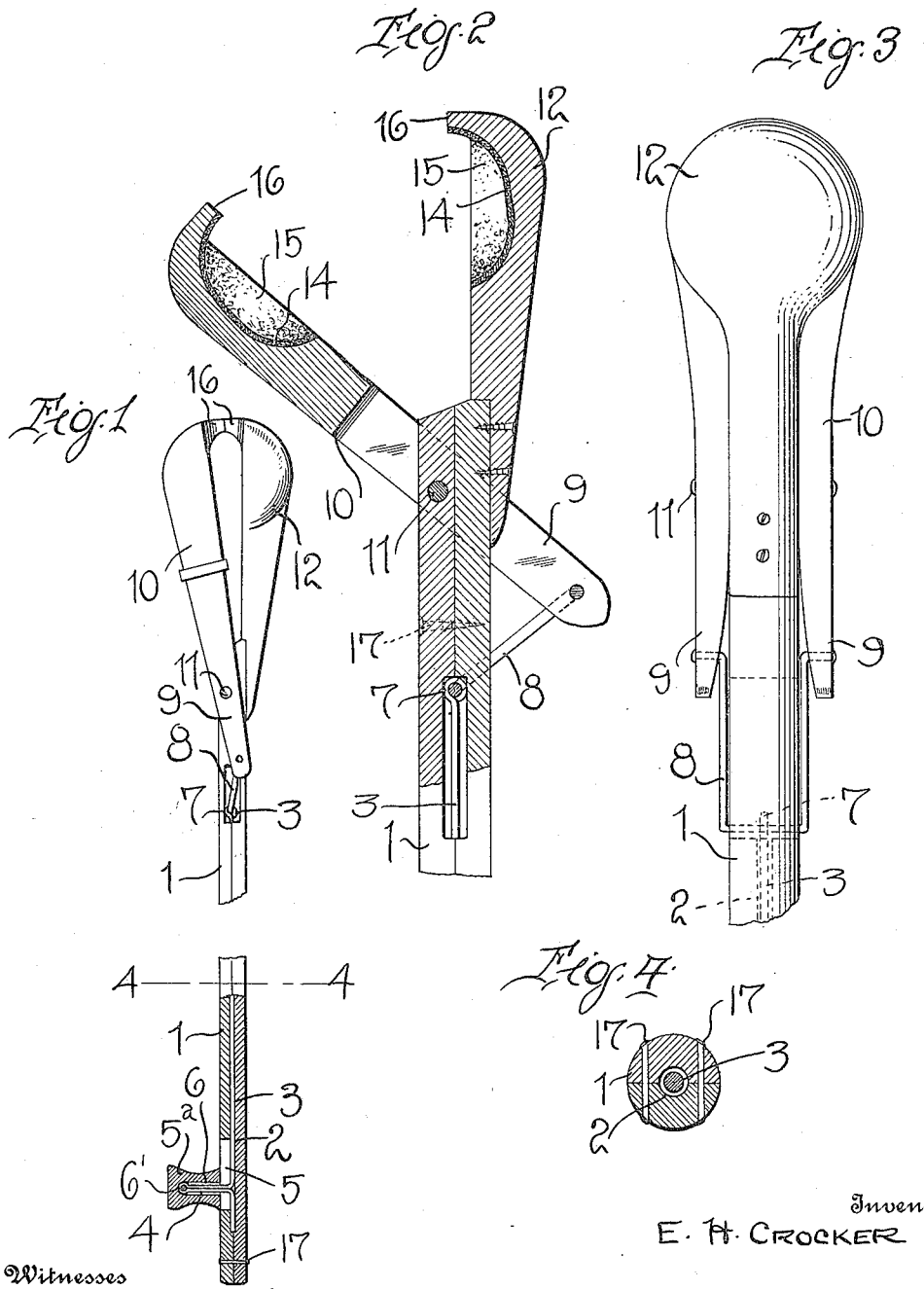

ELIAKIM H. CROCKER, OF STOCKTON SPRINGS, MAINE.

FRUIT-GATHERER.

1,146,052.　　　　　Specification of Letters Patent.　　Patented July 13, 1915.

Application filed September 21, 1914. Serial No. 862,767.

*To all whom it may concern:*

Be it known that I, ELIAKIM H. CROCKER, a citizen of the United States, residing at Stockton Springs, in the county of Waldo and State of Maine, have invented certain new and useful Improvements in Fruit-Gatherers, of which the following is a specification, reference being had to the accompanying drawings.

This invention relates to certain improvements in fruit gatherers, and an object of the invention is to provide a device of this general character having novel and improved means whereby fruit may be picked from any part of a tree or vine in a manner obviating risk to the person gathering the fruit as well as the risk of damage to the tree.

It is also an object of the invention to provide a novel and improved device of this general character comprising two relatively movable jaws adapted to substantially inclose the fruit to be gathered and provided with means engageable with the stem of the fruit whereby the same may be picked in a manner whereby the possibility of injury to the fruit is reduced to a minimum.

The invention consists in the details of construction and in the combination and arrangement of the several parts of my improved fruit gatherer whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawings, wherein—

Figure 1 is a view, partly in elevation and partly in section, of a fruit gatherer constructed in accordance with an embodiment of my invention; Fig. 2 is an enlarged fragmentary view in section of the jaws herein included, said jaws being shown in open adjustment; Fig. 3 is an enlarged elevational view of the jaws; and Fig. 4 is a sectional view taken substantially on the line 4—4 of Fig. 1.

As disclosed in the accompanying drawings, 1 denotes a staff or handle of predetermined length provided with a longitudinal bore 2 intermediate the length thereof and terminating in close proximity to the opposite extremities of the staff or handle 1. Mounted for reciprocal movement within the bore 2 is the elongated rod 3 being bent adjacent one extremity to afford the lateral projection 4 extending through the elongated slot 5 in the handle or staff 1 and secured to such projection 4 is a manipulating knob 5ª, herein disclosed as having an axially disposed recess or pocket, 6 to receive the projection 4 and locked thereto through the medium of the transverse pin 6′ disposed between the substantially parallel strands of the projection.

The opposite extremity of the rod 3 terminates in an eye 7 through which is directed the base portion of the substantially U-shape link 8, the extremities whereof being pivotally engaged with the free extremities of the forks 9 produced in the bifurcated extremity of the jaw 10, such jaw 10 being pivotally engaged with the staff or handle 1 in advance of the rod 3 through the medium of the transverse pin 11 disposed through the staff or handle 1 and the forks 9 of the jaw. It is also to be observed that the handle or staff 1 is provided with a transverse slot disposed entirely therethrough to permit the requisite engagement between the link 8 and the rod, as is believed to be clearly shown in the accompanying drawings. The extremity of the handle or staff 1 with which the jaw 10 is engaged is also provided with a stationary jaw 12 with which the jaw 10 is adapted to coact and the opposed faces of the jaws have produced in the free extremities thereof the recesses or pockets 14 in which the body of the fruit to be gathered may be readily accommodated, and for which purpose said recesses are lined with the soft or yieldable layers 15 of material in order that injury to the fruit when positioned between the jaws 10 and 11 may be reduced to a minimum.

The inner faces of the upper ends of each of the jaws are provided with the inwardly disposed projections or lips 16 adapted to clampingly engage the stem of the fruit so that the same may be readily disengaged from the tree by a slight axial movement of the staff or handle 1.

I find it of advantage to have the staff or handle 1 divided longitudinally into sections in order that the parts may be readily and conveniently assembled, suitable means as generally indicated at 17 being employed for maintaining said sections in operative assemblage.

As herein disclosed, the staff or handle 1 is an elongated body substantially cylindrical in form and of a mean diameter whereby it will be perceived that the same may be used with convenience and facility with the possibility of injury to the tree being reduced to a minimum, and it will be further observed that the structure of the device is such as to make it of comparatively light weight whereby a person may stand upon the ground and gather fruit at a comparatively high point thereabove. It will be further seen that the necessity of a ladder or the like being used is substantially reduced to a minimum, although in such cases where a ladder may be employed it will be perceived that the possibility of the person falling therefrom, incidental to the necessity of reaching for the fruit, will also be substantially entirely avoided.

From the foregoing description, it is thought to be obvious that a fruit gatherer constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. A device of the character described comprising a handle, a stationary jaw carried thereby, a movable jaw pivotally engaged with the handle, means for moving the pivoted jaw toward or from the stationary jaw, said jaws being adapted to grasp the fruit to be harvested and being provided in their opposed faces with pockets to retain the fruit after being harvested, the outer extremities of the jaws being provided with integrally disposed lips to engage the stems of the fruit to be harvested.

2. A device of the character described comprising an elongated handle provided with a longitudinal bore intermediate the length thereof, a rod mounted for longitudinal movement within the bore and provided with a lateral extension projecting exteriorly of the handle to afford a means whereby reciprocatory movement may be imparted to the rod, a stationary jaw carried by one extremity of the handle, a second jaw having one end bifurcated and straddling the handle, said jaws being adapted to grasp the fruit to be harvested and being provided in their opposed faces with pockets to retain the fruit after being harvested, means for pivotally connecting the handle and the forks of the bifurcated end of the last named jaw, and a U-shape link connecting the free extremities of the forks and the adjacent extremity of the rod, said handle having an elongated opening therethrough to permit such connection, the inner faces of the upper ends of the jaws being provided with the inwardly disposed projections.

In testimony whereof I hereunto affix my signature in the presence of two witnesses.

ELIAKIM H. CROCKER.

Witnesses:
H. R. HICHBORN,
RALPH MORSE.

Copies of this patent may be obtained for five cents each, by addressing the "Commissioner of Patents, Washington, D. C."